United States Patent
Tahir et al.

(10) Patent No.: US 10,450,445 B2
(45) Date of Patent: Oct. 22, 2019

(54) BLENDS OF THERMOPLASTIC POLYURETHANES AND RUBBERS AND PROCESS FOR PRODUCING SAME

(71) Applicant: LEIBNIZ-INSTITUT FÜR POLYMERFORSCHUNG DRESDEN E.V., Dresden (DE)

(72) Inventors: Muhammad Tahir, Dresden (DE); Nasir Mahmood, Halle (DE); Klaus Stoeckelhuber, Freiberg (DE); Gert Heinrich, Hannover (DE); Amit Das, Dresden (DE); Rene Jurk, Schwarzheide (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 134 days.

(21) Appl. No.: 14/916,375

(22) PCT Filed: Aug. 28, 2014

(86) PCT No.: PCT/EP2014/068245
§ 371 (c)(1),
(2) Date: Mar. 3, 2016

(87) PCT Pub. No.: WO2015/032681
PCT Pub. Date: Mar. 12, 2015

(65) Prior Publication Data
US 2016/0194483 A1  Jul. 7, 2016

(30) Foreign Application Priority Data
Sep. 4, 2013 (DE) .......................... 10 2013 217 661

(51) Int. Cl.
| | | |
|---|---|---|
| *C08L 9/00* | (2006.01) | |
| *C08L 9/02* | (2006.01) | |
| *C08G 18/08* | (2006.01) | |
| *C08G 18/10* | (2006.01) | |
| *C08G 18/32* | (2006.01) | |
| C08L 75/04 | (2006.01) | |

(52) U.S. Cl.
CPC ............ *C08L 9/02* (2013.01); *C08G 18/0895* (2013.01); *C08G 18/10* (2013.01); *C08G 18/3243* (2013.01); *C08L 75/04* (2013.01)

(58) Field of Classification Search
CPC ...... C08L 9/00; C08L 9/02; C08L 9/06; C08L 75/04; C08L 75/06; C08L 75/08; C08L 75/10

See application file for complete search history.

(56) References Cited

U.S. PATENT DOCUMENTS

| | | | |
|---|---|---|---|
| 3,678,129 A | | 7/1972 | Fischer |
| 4,143,092 A | | 3/1979 | Karmell |
| 4,272,428 A | * | 6/1981 | Lindner .................. C08L 27/06 524/295 |
| 4,374,192 A | | 2/1983 | Mayer et al. |
| 4,822,827 A | * | 4/1989 | Bonk .................. C08G 18/3212 521/170 |
| 5,376,723 A | | 12/1994 | Vogt et al. |
| 5,491,194 A | * | 2/1996 | Henton ............. C08G 18/3212 525/66 |
| 6,291,587 B1 | * | 9/2001 | Bleys ................. C08G 18/0895 525/131 |
| 2004/0260023 A1 | | 12/2004 | Park et al. |
| 2005/0165168 A1 | | 7/2005 | Park |

FOREIGN PATENT DOCUMENTS

| | | |
|---|---|---|
| DE | 3834103 C1 | 1/1990 |
| DE | 10100225 A1 | 7/2002 |
| DE | 69903262 T2 | 10/2002 |

OTHER PUBLICATIONS

Machine Translation of DE 10100225 A1 (Year: 2018).*
Comparative Data from Applicant. (Year: 2019).*
Email from Barry Hollander. (Year: 2019).*
Tahir et al. Blending In Situ Polyurethane-Urea with Different Kinds of Rubber: Performance and Compatibility Aspects. Materials 2018, 11, 2175; doi:10.3390/ma11112175. (Year: 2018).*

(Continued)

*Primary Examiner* — Michael M Dollinger
(74) *Attorney, Agent, or Firm* — Greenblum & Bernstein, P.L.C.

(57) ABSTRACT

The invention relates to the field of chemistry and to the blends that can by way of example be used for rolls and roll coverings in the printing, textile, paper and graphic industry. The problem addressed by the present invention is provision of blends that have improved physical properties, and of a simple low-cost process with low energy consumption for producing same. The problem is solved via blends of thermoplastic polyurethanes and rubbers, consisting of rubber and from 5 to 80% by weight of thermoplastic polyurethanes, where the materials intermesh with one another in the regions of contact between rubber and polyurethanes. The problem is further solved via a process in which at least one rubber and from 5 to 80% by weight of polyurethane precursors are mixed and homogenized, where the precursors are prepolymers made of polyisocyanate(s) and of macroglyeol(s) and at least one chain extender, and/or monomers of polyisocyanates, of macroglycols and of chain extenders.

15 Claims, No Drawings

(56) References Cited

OTHER PUBLICATIONS

Tahir et al. Highly reinforced blends of nitrile butadiene rubber and in-situ synthesized polyurethane-urea. European Polymer Journal 73 (2015) 75-87. http://dx.doi.org/10.1016/j.eurpolymj.2015.09.024. (Year: 2015).*

Ilija Dimitrievski et al., "Study of Some Elastomers-Polyurethane Ionomer Blends", Adv. Poly Blends & Alloys 4, 1993, pp. 19-29.

"Polyblend", Wikipedia.org/de, 2013, pp. 1.

J.H. Tan et al., "Novel blends of acrylonitrile butadiene rubber and polyurethane-silica hybrid networks", eXPRESS Polymer Letters 6, 2012, pp. 588-600.

Klaus Werner Stöckelhuber et al., "Enhanced Mechanical and Dynamic-Mechanical Properties of Blends Composed of Nitrile Butadiene Rubber and in-situ synthesized Polyurethane-Urea via Precursor Route", POLYCHAR 22 World Forum on Advanced Materials, 2014, pp. 1.

Urska Sebenik et al., "Dynamic Mechanical Properties and Structure of In Situ Cured Polyurethane/Hydrogenated Nitrile Rubber Compounds: Effekt of Carbon Black Type", Appl. Poly.Sci. 125, 2012, pp. E41-E48.

J. Karger-Kocsis et al., "Mechanical and tribological properties of rubber blends composed of HNBR and in situ produced polyurethane", Wear 268, 2010, pp. 464-472.

Sonal Desai et al., "Polyurethane-Nitrile Rubber Blends", J. Macromol. Sci.-Pure Appl. Chem., 2001, pp. 711-729.

K.-H. Ott et al., "Technische Polymer-Blends", Kunststoff Handbuch, 1993, pp. 1-2.

German Office action issued with respect to Application No. 10 2013 217 661.9 dated Apr. 16, 2014.

International Search Report issued with respect to Application No. PCT/EP2014/068245, dated Nov. 19, 2014.

International Preliminary Report on Patentability issued with respect to Application No. PCT/EP2014/068245, dated Mar. 8, 2016.

* cited by examiner

BLENDS OF THERMOPLASTIC POLYURETHANES AND RUBBERS AND PROCESS FOR PRODUCING SAME

The invention relates to the field of chemistry and to blends of thermoplastic polyurethanes and rubbers, such as those which can for example be used for applications in which satisfactory mechanical properties, satisfactory tensile strength and abrasion resistance, satisfactory damping properties, and high chemical resistance are required, such as for rollers and roller covers in the printing, textile, paper and graphics industries; industrial wheels; bumpers; pump impellers or drive belts, and to a method for the production thereof.

The interest in application-oriented polymer research is also focused on combining polymers that are known per se in order to combine the properties thereof with one another. The result of combinations of this type is what is referred to as polymer blends. The term polymer blends denotes mixtures of chemically distinct polymers, wherein the chemical distinctness of the polymers determines their immiscibility or partial miscibility. Polymer blends are characterized by their chemical structure, the conformation of their chain molecules at the molecular level and their state of order at the supramolecular level, referred to as morphology. The polymer blends produced in the mixing of different polymers can exhibit improved mechanical and tribological properties compared to the individual polymers, as the properties of the polymer blends in this case result from the combination of the properties of the polymers involved (Ott, K. H., et. al.: Kunststoffhandbuch, Polymerblends, 1, Carl Hanser Verlag, 1993).

Mixtures of several polymers are referred to as polymer blends. These blends are defined as a macroscopically homogeneous mixture of two or more different polymers. They are typically produced by means of an intensive mechanical mixing of molten polymers, wherein a homogeneous material results. When the melt cools, the polymer chains remain finely distributed and thus ensure that that the property profile of the blend is a permanently maintained overlap of the properties of the individual polymers (Wikipedia, keyword "polymer blend").

Numerous composites made of polyurethanes and rubbers are known from the prior art.

From U.S. Pat. No. 5,376,723 a theimoplastic polyurethane-elastomer blend is known which is composed of at least 30 to at most 40 percent by volume of a polyurethane component and at least 60 to at most 70 percent by volume of a nitrile rubber, and which has a Shore A hardness of approximately 55 to 70 with an added plasticizer. The polyurethane component thereby contains at least 50 percent by weight of polyisocyanate, and the nitrile rubber component contains approximately 34 mole percent acrylonitrile.

From U.S. Pat. No. 6,291,587 a composite is known which of a hard thermoplastic polyurethane with a glass transition temperature of less than 60° C. and a rubber-like material from the group of rubbers, thermoplastic elastomers, thermoplastic vulcanizates, and plastomers that have a glass transition temperature of less than −20° C. The weight ratio of thermoplastic polyurethane to rubber is thereby at most 50:50.

Furthermore, from U.S. Pat. No. 3,678,129 a thermoplastic polymer blend is known comprising polyvinyl chloride, polyether urethane and a butadiene-acrylonitrile copolymer, wherein the blend comprises 65 to 80 parts by weight of the polyvinyl halide resin having a specific viscosity of 0.28 to 0.4; 5 to 25 parts by weight of an uncured aliphatic hydrocarbon diene aliphatic nitrile rubber copolymer having a Mooney viscosity of 47 to 70; and 5 to 25 parts by weight of a polyether polyurethane having a 350° F. melt index of 0 to 100.

Additionally, from U.S. Pat. No. 4,143,092, a method for modifying the hardness of an acrylonitrile rubber is known in which the quantity of plasticizer for adjusting the hardness of the cured rubber to the desired hardness of the rubber mix is added using a curing agent during the mixing of a rubber prepolymer. In this case, the plasticizer is a mixture composed of 25% to 75% of an ester plasticizer and 75% to 25% of a viscous liquid reaction product of a polyurethane elastomer and an amine, wherein the ester plasticizer has general compatible properties with the rubber and the polyurethane reaction product, dioctyl phthalate, dibutyl adipate, dioctyl adipate and dioctyl sebacate.

Furthermore, from U.S. Pat. No. 4,374,192 an electrophotographic developer is known comprising coated carrier particles together with toner particles, wherein the coating is composed of a mixture of a butadiene-acrylonitrile rubber. The mixture containing 20 percent to 40 percent by weight of acrylonitrile and a polyurethane elastomer and is soluble in organic solvents.

Also known is the synthesis of polyurethane by means of the simultaneous conversion of hydroxyl-terminated polybutadiene, toluene diisocyanate and the crosslinker 1,1,1-trimethylpropane in a solution which contains nitrile-butadiene rubber, sulfur and filler material (Desai, S.; et al: J. Macromol. Sci. 2001, 38, 711-729).

Also known is the production of mixtures of self-synthesizing polyurethane ionomers and nitrile-butadiene rubber by means of a melt mixing process. In this process, the mixtures are vulcanized using sulfur crosslinkers and simultaneously crosslinked by triisocyanate (Dimitrievski, I.: Adv. Poly. Blends & Alloys, 1993, 4, 19-29).

Also known is the production of a mixture of polyurethane precursor systems comprising crystalline polyol compounds and polyisocyanate compounds and peroxide-curable hydrogenated nitrile-butadiene rubbers (Sebenik, U., et. al.: Appl. Poly. Sci. 2012, 125, E41-E48; Karger-Kocsis, J. et al., Wear 2010, 268, 464-472). A simultaneous reaction of the polyurethane precursor is thereby achieved after a deblocking of the polyisocyanate compound and the crosslinking of the hydrogenated nitrile-butadiene rubber during the vulcanization process.

Also known is the production of polyurethane-silica hybrid networks and acrylonitrile-butadiene rubber by means of melt mixing. In this case, a reaction of isocyanate-terminated prepolymers with the hydroxyl groups on silica surfaces is proposed, which reaction occurs during the crosslinking of the nitrile-butadiene rubber (Tan, J. H.: eXPRESS Poly. Lett. 2012, 6, 588-600). Disadvantages of the prior art are that known thermoplastic polymer blends exhibit unsatisfactory physical properties. It is also disadvantageous that known methods for producing thermoplastic polymer blends are energy- and cost-intensive.

The object of the present invention is to specify blends of thermoplastic polyurethanes and rubbers that exhibit improved physical properties, and a simple energy- and cost-efficient method for the production thereof.

The object is attained by the invention disclosed in the claims. Advantageous embodiments of the invention are the subject matter of the dependent claims.

The blends of thermoplastic polyurethanes and rubbers disclosed by the invention are composed of rubber or a rubber mixture and 5 to 80 percent by weight, based on the blend, of one or more thermoplastic polyurethanes that are present in the rubber or in the rubber mixture in a homogenized manner, and wherein intermeshing of the materials with one another is present in the regions of contact between the rubber or rubber mixtures.

Advantageously present as rubbers or rubber mixtures are synthetic rubbers, natural rubbers, acrylic rubbers, chloroprene rubbers, halobutyl rubbers, polyurethane rubbers, isoprene rubbers, butyl rubbers, nitrile-butadiene rubbers, thermoplastic elastomers, thermoplastic vulcanizates and/or plastomers or mixtures thereof, advantageously vulcanized rubbers or rubber mixtures.

Likewise advantageously, up to 70 percent by weight, based on the blend, of thermoplastic polyurethanes are present.

In the method disclosed by the invention for producing blends of thermoplastic polyurethanes and rubbers, at least one rubber or one rubber mixture is homogenized, wherein 5 to 60 percent by weight of precursors of polyurethanes, based on the blend, are added and homogenized after the homogenization, wherein the precursors are:
one or more prepolymers made of polyisocyanate(s) and macroglycol(s) and at least one chain extender,
and/or
monomers of one or more polyisocyanates, macroglycols and chain extenders.

Advantageously used as rubbers or rubber mixtures are synthetic rubbers, natural rubbers, acrylic rubbers, chloroprene rubbers, halobutyl rubbers, polyurethane rubbers, isoprene rubbers, butyl rubbers, thermoplastic elastomers, thermoplastic vulcanizates and/or plastomers or mixtures thereof.

Also advantageously used as rubbers or rubber mixtures will be diene rubbers and/or hydrogenated diene rubbers, in particular nitrile rubbers, such as nitrile-butadiene rubbers, carboxylated nitrile-butadiene rubbers, hydrogenated nitrile-butadiene rubbers, hydrogenated carboxylated nitrile-butadiene rubbers, nitrile-isoprene rubbers, butadiene rubbers and/or styrene-butadiene rubbers.

Furthermore aliphatic, aromatic, cycloaliphatic and/or araliphatic polyisocyanates, in particular diisocyanates, are advantageously used as polyisocyanates.

And also advantageously used are macroglycols based on polyolefins, polycarbonates, polyacetates, polysiloxanes, polycaprolactones, polyesters, polyethers and/or block copolymers of polyester and polyether or mixtures thereof.

It is also advantageous if amine-based compounds; multifunctional compounds containing isocyanate-reactive hydrogen atoms; diols; diamine and/or mixtures of these materials are used as chain extenders.

Furthermore, it is advantageous if the prepolymer is produced by a mixing and reactive conversion of polyisocyanate(s) and macroglycol(s).

It is also advantageous if vulcanizing agents, crosslinkers and/or auxiliary materials and accessory agents such as sulfur compounds, accelerated sulfur compounds, peroxides, hydrogen peroxide coagent compounds, phenolic resins, catalysts, plasticizer oils, organic filler materials, inorganic filler materials, antioxidants, plasticizers, UV-stabilizers, flame retardants and/or additives are used.

And it is also advantageous if 5 to 80 percent by weight, based on the blend, of prepolymer made of polyisocyanate(s) and macroglycol(s) is added and homogenized together with chain extenders.

It is also advantageous if the homogenization and vulcanization are carried out in an internal mixer, rolling mill and/or extruder.

With the solution according to the invention, it becomes possible for the first time to provide, using a method, a blend of thermoplastic polyurethanes and rubbers that exhibit improved physical properties and can be produced easily and energy- and cost-efficiently.

The blends according to the invention are thereby composed of thermoplastic polyurethanes and rubbers, wherein 5 to 80 percent by weight, based on the blend, of one or more thermoplastic polyurethanes are present in the blends, which polyurethanes are present in the rubber or in the rubber mixture in a homogenized manner, and wherein intermeshing of the materials with one another is present in the regions of contact between the rubber or rubber mixtures and the polyurethanes.

The rubbers or rubber mixtures present according to the invention are advantageously vulcanized rubbers or vulcanized rubber mixtures, synthetic rubbers, natural rubbers, acrylic rubbers, chloroprene rubbers, halobutyl rubbers, polyurethane rubbers, isoprene rubbers, butyl rubbers, nitrile-butadiene rubbers, thermoplastic elastomers, thermoplastic vulcanizates and/or plastomers or mixtures thereof.

Advantageously present in the blend are up to 70 percent by weight of thermoplastic polyurethanes, which are present in the rubber or in the rubber mixture in a homogenized manner and which comprise intermeshing of the materials with one another in the regions of contact between the rubber or rubber mixtures and the polyurethanes.

The blends disclosed by the invention are produced according to the invention by a method in which at least one rubber or one rubber mixture is homogenized. From 5 to 80 percent by weight of precursors of polyurethanes, based on the blend, is subsequently added and homogenized with the rubber or the rubber mixture. These precursors are:
one or more prepolymers made of polyisocyanate(s) and macroglycol(s) and at least one chain extender,
and/or
monomers of one or more polyisocyanates, macroglycols and chain extenders.

Advantageously, a prepolymer made of polyisocyanate(s) and macroglycol(s) is produced by means of mixing and reactive conversion and is added to the rubber or the rubber mixture together with at least one chain extender.

By means of the method according to the invention, the thermoplastic polyurethane is synthesized in situ in the rubber during the mixing and homogenizing as a result of addition reactions of the isocyanate groups of the precursors, that is, the prepolymers made of polyisocyanates and macroglycols or of the monomers of polyisocyanates and macroglycols, and the amine groups of the chain extender.

The polymer blend produced in this manner is then advantageously subjected to a vulcanization process of the rubber or the rubber mixture. Instead of the prepolymer produced from polyisocyanates and macroglycols, the monomers of polyisocyanates and macroglycols can directly be used together with the chain extender for the in situ formation of thermoplastic polyurethanes in the rubber.

It is advantageously achieved with the method according to the invention that in situ synthesized polyurethane is formed by the addition of the precursors during the mixing with the rubber or the rubber mixture, which polyurethane develops an improved homogenization and an intermeshing of the materials in the regions of contact between the polyurethane and the rubber, which results in improved properties of the blend according to the invention, such as an improved elasticity modulus and increased rupture stress, ultimate elongation and hardness with reduced abrasion characteristics, for example.

The blend according to the invention has an isocyanate index of 90 to 110. The isocyanate index is understood as the percentage ratio of isocyanate groups to isocyanate-reactive hydrogen atoms in the blend.

Most polymers are not miscible at the molecular level due to thermodynamic reasons. Usually, multi-phase systems are created in the product of a mixture of different polymers, wherein domains of the other polymer are generally produced in a matrix of the one reaction partner. The selection of the polymerization method and thus the physical-chemical mixture of the two phases have a critical influence on the typically only small boundary tensions between the individual phases and the microstructure of the mostly coarsely dispersive blends.

With the solution according to the invention, it was surprisingly possible to learn that blends of thermoplastic polyurethanes and rubbers can be produced with advantageous properties if the polyurethane precursors/precursors of a prepolymer made of polyisocyanate(s) and macroglycol(s) and chain extender or of monomers of polyisocyanate(s) and macroglycol(s) and chain extender are synthesized in situ to form thermoplastic polyurethanes during the homogenization, and advantageously the vulcanization, of the rubbers.

It is particularly advantageous that, unlike the known prior art, no cost-intensive solvents have to be used on the one hand, and that it is possible to omit the prior production of polyurethanes.

Organic polyisocyanates used according to the invention are advantageously aliphatic, aromatic, cycloaliphatic and araliphatic polyisocyanates, primarily diisocyanates such as hexamethylene diisocyanate; isophorone diisocyanate; 4,4'-diisocynate; tetramethyl-m-xylylene diisocyanate; tetramethyl-p-xylylene diisocyanate; toluene diisocyanate; xylene diisocyanate; phenylene diisocyanate; preferably 4,4' diphenylmethane diisocyanate, if necessary with isomers of diphenylmethane diisocyanate. The polyisocyanate used according to the invention can also be a compound with reactive isocyanate side groups, as is known in polyurethane technology.

Also advantageously used according to the invention are macroglycols, also referred to as polyols, which are based on polyolefins, polycarbonates, polyacetates, polysiloxanes, preferably polycaprolactone, polyesters, polyethers, block copolymers of polyester/polyether and the like, and mixtures thereof. Saturated and/or unsaturated polyols can also be used according to the invention.

Advantageously used as a chain extender can be multifunctional compounds and in particular compounds containing diisocyanate-reactive hydrogen, preferably diols and more preferably diamines or a mixture of different types. The amine-based chain extenders, preferably diamines, can be selected from the following substance classes: 4,4'-methylenedianiline; o-phenylenediamine; m-phenylenediamine; p-phenylenediamine; 4,4'-methylenebis(2-methoxyaniline); bis(4-amino-2-chloro-3,5-diethylphenyl)methane; 4,4'-methylenebis(2,6-diethylaniline); 4,4'-methylenebis(2-methylaniline); 4,4'-methylenebis(2,6-dimethylaniline); 4,4'-methylenebis(2-isopropyl-6-methyl aniline); 4,4'-methylenebis(2,6-diisopropylaniline); diethyl-toluenediamine; 4,4'-diaminodiphenyl sulfone; 3,3'-diaminodiphenyl sulfone; 4,4-methylenebis(2-chloroaniline); trimethylenebis(4-aminobenzoate); methylenebis(2-ethyl-6-methylaniline); 3,5-dimethylthio-2,4-toluenediamine; 3,5-dimethylthio-2,6-toluenediamine; 3,5-diethyltoluene-2,6-diamine; 3,5-diethyltoluene-2,4-diamine; naphthalene-1,8-diamine; 2,4-toluenediamine; 2,6-toluenediamine; 3,4-toluenediamine; benzidine and the derivates thereof; 1,3-bis(3-aminophenoxy)benzene; 4,4'-diaminodiphenyl ether; diaminodihydroxyl sulfone; 4,4'-((p-phenylene)diisopropylidene)dianiline; 4,4'-((m-phenylene)diisopropylidene)dianiline. Secondary amine chain extenders and complex compounds with a delayed chain extender effect with blocked hydroxyl groups and/or amine functionalities can also be used to produce the blends according to the invention.

The rubber component can be selected from any desired conventional rubbers that are known in the art. From polar rubbers such as nitrile-butadiene rubber, carboxylated nitrile-butadiene rubber, hydrogenated nitrile-butadiene rubber, hydrogenated carboxylated nitrile-butadiene rubber, nitrile-isoprene rubber, acrylic rubber, chloroprene rubber, halobutyl rubber, polyurethane rubber and the like; also from non-polar rubbers such as natural rubber, isoprene rubber, butadiene rubber, styrene-butadiene rubber, butyl rubber and the like; or from mixtures of different rubbers. The rubber component can also be composed of thermoplastic elastomers, thermoplastic vulcanizates, plastomers or other rubber-like materials.

The rubber component of this invention is, in particular, diene rubbers, hydrogenated diene rubbers, preferably nitrile rubber and advantageously nitrile-butadiene rubber.

The rubber component is preferably crosslinked by means of conventional vulcanization or electron beam induced vulcanization.

Typical crosslinkers, as is known in the art, are sulfur compounds, accelerated sulfur compounds, peroxides, hydrogen peroxide coagent compounds, phenolic resins and/or combinations thereof.

Auxiliary materials and accessory agents that are typical for polyurethane and rubber technology can also be used. This includes the use of compatibilization agents, such as surface-active substances for example, in order to adjust the interfacial tension between the polyurethane and rubber phases. Also included are catalysts, plasticizer oils, organic and inorganic filler materials, antioxidants, plasticizers, UV-stabilizers, flame retardants and other substances suitable as additives for the mixtures according to the invention.

The in situ method according to the invention can be performed with the use of conventional internal mixers, rolling mills or extruders, which are known in the art.

The method according to the invention is also particularly advantageous because highly reactive and highly molecular amine-based chain extenders can be used, without applying a catalyst, to obtain the blend according to the invention, which blend is composed of a matrix of rubber in which polyurethane is distributed in a finely dispersed manner. It is thereby advantageous that a significant mechanical strengthening of the blend is achieved by the diamine content of the chain extender in the thermoplastic polyurethanes synthesized in situ.

In addition, the method according to the invention renders possible a high flexibility for adjusting the soft and hard segment proportions of the thermoplastic polyurethanes synthesized in situ and results in considerably improved physical properties, in particular tensile strength and abrasion resistance.

The invention is explained below in greater detail with the aid of two exemplary embodiments:

EXAMPLE 1

100 g of nitrile-butadiene rubber is kneaded for 5 minutes at 120° C. and 60 rpm in a heated internal mixer (Haake Rheomix 600P). 8.2 g of prepolymer (methylenediphenyldiisocyanate, polyester-based prepolymer, with 8.54 percent by weight isocyanate) and 2.9 g of 4,4'-(m-phenylene diisopropylidene)aniline is premixed as a chain extender and added to the rubber for mixing, and the components are mixed for 5 minutes at 120° C. An isocyanate index of 100 is set as the result of the starting materials added. The obtained mixture is then blended on a rolling mill (Servitec Polymix 110L) with 5 g of zinc oxides, 2 g of stearic acid, 1.7 g of N-cyclohexyl-2-benzothiazolylsulfenamide (CBS) and 2 g of sulfur and subsequently vulcanized on a heat press at a temperature of 150° C. and a pressure of 15 MPa.

Mechanical properties of the produced blend (NBR/PU 90/10) as compared to pure NBR are shown in Table 1.

TABLE 1

| Test Standard | Physical Property | NBR | NBR/PU 90/10 |
|---|---|---|---|
| DIN 53504 | Elasticity modulus (MPa) | 2.9 | 4.3 |
| DIN 53504 | Tensile strength (MPa) | 2.3 | 2.9 |
| DIN 53504 | Ultimate elongation (%) | 304 | 290 |
| DIN 53505 | Hardness (Shore A) | 49 | 52 |
| DIN 53516 | Abrasion (mm$^3$) | 178 | 150 |

EXAMPLE 2

An additional nitrile rubber mixture with in situ synthesized thermoplastic polyurethanes according to Example 1, but having an 80/20 weight ratio, was produced using the same method as in Example 1. Table 2 indicates the physical properties of this blend.

TABLE 2

| Test Standard | Physical Property | NBR/PU 80/20 |
|---|---|---|
| DIN 53504 | Elasticity modulus (MPa) | 6.7 |
| DIN 53504 | Tensile strength (MPa) | 4.3 |
| DIN 53504 | Ultimate elongation (%) | 344 |
| DIN 53505 | Hardness (Shore A) | 58 |
| DIN 53516 | Abrasion (mm$^3$) | 135 |

The invention claimed is:

1. A method for producing blends of polyurethane-ureas and rubbers comprising:
   a) admixing and homogenizing by melt mixing precursors of a polyurethane with at least one rubber or one rubber mixture to produce a polyurethane-urea in situ in the rubber or rubber mixture, the amount of precursors of the polyurethane being 20 to 60 percent by weight, based on the weight of the blend, wherein the precursors comprise:
      1) one or more prepolymers made of polyisocyanate(s) and macroglycol(s) and at least one chain extender, and/or
      2) monomers of one or more polyisocyanates, macroglycols and chain extenders, and then
   b) vulcanizing the molten rubber or molten rubber mixture,
   wherein the chain extenders comprise at least one of amine-based chain extenders; diamines and/or mixtures of these materials.

2. Method according to claim 1 wherein the rubber or rubber mixture comprises at least one of synthetic rubbers, natural rubbers, acrylic rubbers, chloroprene rubbers, halobutyl rubbers, polyurethane rubbers, isoprene rubbers, butyl rubbers, thermoplastic elastomers, thermoplastic vulcanizates and/or plastomers or mixtures thereof.

3. Method according to claim 2 wherein the rubber or rubber mixture comprises at least one of diene rubbers and/or hydrogenated diene rubbers, nitrile rubbers, nitrile-butadiene rubbers, carboxylated nitrile-butadiene rubbers, hydrogenated nitrile-butadiene rubbers, hydrogenated carboxylated nitrile-butadiene rubbers, nitrile-isoprene rubbers, butadiene rubbers or styrene-butadiene rubbers.

4. Method according to claim 1 wherein the polyisocyanates comprise at least one of aliphatic, aromatic, cycloaliphatic and/or araliphatic polyisocyanates.

5. Method according to claim 1 wherein the macroglycols comprise at least one of macroglycols based on polyolefins, polycarbonates, polyacetates, polysiloxanes, polycaprolactones, polyesters, polyethers and/or block copolymers of polyester and polyether or mixtures thereof.

6. Method according to claim 1 wherein the prepolymer is produced by a mixing and reactive conversion of polyisocyanate(s) and macroglycol(s).

7. Method according to claim 1 wherein the rubber or rubber mixture is vulcanized or crosslinked with:
   a) vulcanizing agents or crosslinkers comprising sulfur compounds, accelerated sulfur compounds, peroxides, hydrogen peroxide coagent compounds, phenolic resins, or combinations thereof, and/or
   b) auxiliary materials and accessory agents or additives comprising catalysts, plasticizer oils, organic filler materials, inorganic filler materials, antioxidants, plasticizers, UV-stabilizers, or flame retardants.

8. Method according to claim 1 wherein 20 to 60 percent by weight, based on the weight of the blend, of prepolymer made of polyisocyanate(s) and macroglycol(s) is added and homogenized together with chain extenders.

9. Method according to claim 1 wherein the homogenization and vulcanization are carried out in an internal mixer, a rolling mill and/or an extruder.

10. A method for producing blends of polyurethane-ureas and rubbers comprising:
    a) admixing and homogenizing by melt mixing precursors of a polyurethane with at least one rubber or one rubber mixture to produce a polyurethane-urea in situ in the rubber or rubber mixture, the amount of precursors of the polyurethane being 20 to 60 percent by weight, based on the weight of the blend, wherein the precursors comprise:
       1) one or more prepolymers made of polyisocyanate(s) and macroglycol(s) and at least one chain extender, and/or
       2) monomers of one or more polyisocyanates, macroglycols and chain extenders, and then
    b) vulcanizing the rubber or rubber mixture,
    wherein the macroglycols comprise at least one of macroglycols based on polycarbonates, polyacetates, polysiloxanes, polycaprolactones, polyesters, polyethers and/or block copolymers of polyester and polyether or mixtures thereof, and the chain extenders comprise at least one of amine-based chain extenders; diamines and/or mixtures of these materials.

11. Blends of polyurethane-ureas and rubbers made by the method of claim 10, comprising vulcanized rubber or a vulcanized rubber mixture and 20 to 60 percent by weight, based on the weight of the blend, of one or more thermoplastic polyurethanes that are present in the vulcanized rubber or in the vulcanized rubber mixture in a homogenized manner, and wherein intermeshing of the materials with one another is present in the regions of contact between the vulcanized rubber or vulcanized rubber mixtures and the polyurethanes.

12. Method according to claim 1 wherein the chain extender comprises one or more of 4,4'-methylenedianiline; o-phenylenediamine; m-phenylenediamine; p-phenylenediamine; 4,4'-methylenebis(2-methoxyaniline); bis(4-amino-2-chloro-3,5-diethylphenyl)methane; 4,4'-methylenebis(2,6-diethylaniline); 4,4'-methylenebis(2-methylaniline); 4,4'-methylenebis(2,6-dimethylaniline); 4,4'-methylenebis(2-isopropyl-6-methylaniline); 4,4'-methylenebis(2,6-diisopropylaniline); diethyltoluenediamine; 4,4'-diaminodiphenyl sulfone; 3,3'-diamino diphenyl sulfone; 4,4-methylenebis(2-chloro aniline); trimethylenebis(4-aminobenzoate); methylenebis(2-ethyl-6-methylaniline); 3,5-dimethylthio-2,4-toluenediamine; 3,5-dimethylthio-2,6-toluenediamine; 3,5-diethyltoluene-2,6-diamine; 3,5-diethyltoluene-2,4-diamine, naphthalene-1,8-diamine; 2,4-toluenediamine; 2,6-toluenediamine; 3,4-toluenediamine; benzidine and the derivates thereof; 1,3-bis(3-aminophenoxy)benzene; 4,4'-diaminodiphenyl ether; diaminodihydroxyl sulfone; 4,4'-((p-phenylene)diisopropylidene)dianiline; or 4,4'-((m-phenylene)diisopropylidene)dianiline.

13. Method according to claim 10 wherein the chain extender comprises one or more of 4,4'-methylenedianiline; o-phenylenediamine; m-phenylenediamine; p-phenylenediamine; 4,4'-methylenebis(2-methoxyaniline); bis(4-amino-2-chloro-3,5-diethylphenyl)methane; 4,4'-methylenebis(2,6-diethylaniline); 4,4'-methylenebis(2-methylaniline); 4,4'-methylenebis(2,6-dimethylaniline); 4,4'-methylenebis(2-isopropyl-6-methylaniline); 4,4'-methylenebis(2,6-diisopropylaniline); diethyltoluenediamine; 4,4'-diaminodiphenyl sulfone; 3,3'-diaminodiphenyl sulfone; 4,4-methylenebis(2-chloro aniline); trimethylenebis(4-aminobenzoate); methylenebis(2-ethyl-6-methylaniline); 3,5-dimethylthio-2,4-toluenediamine; 3,5-dimethylthio-2,6-toluenediamine; 3,5-diethyltoluene-2,6-diamine; 3,5-diethyltoluene-2,4-diamine, naphthalene-1,8-diamine; 2,4-toluenediamine; 2,6-toluenediamine; 3,4-toluenediamine; benzidine and the derivates thereof; 1,3-bis(3-aminophenoxy)benzene; 4,4'-diaminodiphenyl ether; diaminodihydroxyl sulfone; 4,4'-((p-phenylene)diisopropylidene)dianiline; or 4,4'-((m-phenylene)diisopropylidene)dianiline.

14. Blends of polyurethane-ureas and rubbers made by the method of claim 1, comprising vulcanized rubber or a vulcanized rubber mixture and 20 to 60 percent by weight, based on the weight of the blend, of one or more polyurethanes that are present in the vulcanized rubber or in the vulcanized rubber mixture in a homogenized manner, and wherein intermeshing of the materials with one another is present in the regions of contact between the vulcanized rubber or vulcanized rubber mixtures and the polyurethanes.

15. Blends according to claim 14 comprising synthetic rubbers, natural rubbers, acrylic rubbers, chloroprene rubbers, halobutyl rubbers, polyurethane rubbers, isoprene rubbers, butyl rubbers, nitrile-butadiene rubbers, thermoplastic elastomers, thermoplastic vulcanizates and/or plastomers or mixtures thereof.

* * * * *